US009056492B2

(12) United States Patent
Yamanouchi

(10) Patent No.: US 9,056,492 B2
(45) Date of Patent: Jun. 16, 2015

(54) PRINTING APPARATUS

(71) Applicant: Sharp Kabushiki Kaisha, Osaka (JP)

(72) Inventor: Takao Yamanouchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/143,447

(22) Filed: Dec. 30, 2013

(65) Prior Publication Data

US 2014/0192382 A1 Jul. 10, 2014

(30) Foreign Application Priority Data

Jan. 9, 2013 (JP) ................................ 2013-001648

(51) Int. Cl.
*G06K 15/00* (2006.01)
*B41J 3/60* (2006.01)

(52) U.S. Cl.
CPC ........................................ *B41J 3/60* (2013.01)

(58) Field of Classification Search
CPC combination set(s) only.
See application file for complete search history.

(56) References Cited

U.S. PATENT DOCUMENTS

2003/0161671 A1* 8/2003 Hokiyama .................... 400/188
2004/0179053 A1* 9/2004 Itoh ................................ 347/16
2008/0100865 A1* 5/2008 Okano ......................... 358/1.15

FOREIGN PATENT DOCUMENTS

JP 2002-335370 11/2002
JP 2006-127198 A 5/2006

* cited by examiner

*Primary Examiner* — Ashish K Thomas
*Assistant Examiner* — Idowu O Osifade
(74) *Attorney, Agent, or Firm* — Renner, Otto, Boisselle & Sklar, LLP

(57) ABSTRACT

A printing apparatus is an apparatus capable of performing double-sided printing on a sheet, and is provided with a receiving portion and a control portion. The receiving portion receives an instruction for changing a sheet having one side printed that is set to a paper feed tray into a sheet having both sides printed with same printing content. The control portion performs control, when the instruction is received, to feed the sheet having one side printed from the paper feed tray, and when the fed sheet is an odd-numbered page and is a final page, to discharge the sheet without newly performing printing, and when the fed sheet is an odd-numbered page and is not a final page, to print information printed on a next even-numbered page on a back side of the sheet.

5 Claims, 9 Drawing Sheets

PRINTING APPARATUS

CROSS-NOTING PARAGRAPH

This non-provisional application claims priority under 35 U.S.C. §119(a) on Patent Application No. 2013-001648 filed in JAPAN on Jan. 9, 2013, the entire contents of which are hereby incorporated herein by reference.

FIELD OF THE INVENTION

The present invention relates a printing apparatus, and more specifically to a printing apparatus capable of performing double-sided printing without wasting a sheet for which double-sided printing should have been performed but single-sided printing has been performed by mistake.

BACKGROUND OF THE INVENTION

Conventionally, a printing apparatus such as a printer or a multi-functional peripheral (MFP) capable of performing double-sided printing by handling a sheet automatically has been distributed. Such a printing apparatus needs a mechanism which reverses a sheet mechanically or the like, but is useful because double-sided printing is able to be performed without manually setting a sheet again after single-sided printing.

On the other hand, a printing apparatus which does not need such a mechanism and performs double-sided printing by manually supplying a sheet again is also proposed (for example, see Japanese Laid-Open Patent Publication No. 2006-127198). In a printing apparatus described in Japanese Laid-Open Patent Publication No. 2006-127198, an image of an even-numbered page which corresponds to a back face side at the time of double-sided printing is firstly subjected to single-sided printing in inverse order from an end page, a sheet which is discharged to a paper discharge tray after single-sided printing is completed is supplied to a paper feed tray manually, and an image of an odd-numbered page is caused to be printed on the other side (back side) which is a non-printed side of the fed sheet.

As described above, in a technology described in Japanese Laid-Open Patent Publication No. 2006-127198, assuming in advance that double-sided printing is performed, single-sided printing is performed, and thereafter the sheet having one side printed is put in the paper feed tray and a page corresponding to a back side (non-printed side) of the sheet is printed.

However, in the printing apparatus capable of performing double-sided printing by handling a sheet automatically, when performing double-sided printing, single-sided printing may be performed by an erroneous operation, and, in such a case, a mechanism which enables recovery easily is not provided, so that all sheets having one side printed are wasted.

SUMMARY OF THE INVENTION

The present invention aims to enable, with respect to a sheet for which an operation has been performed to execute single-sided printing by mistake even though double-sided printing is to be performed, to reuse the sheet easily in a printing apparatus capable of performing double-sided printing.

An object of the present invention is to provide a printing apparatus capable of performing double-sided printing on a sheet, comprising: a receiving portion for receiving an instruction for changing a sheet having one side printed that is set to a paper feed tray into a sheet having both sides printed with same printing content, and a control portion for performing control, when the instruction is received, to feed the sheet having one side printed from the paper feed tray, and when the fed sheet is an odd-numbered page and is a final page, to discharge the sheet without newly performing printing, and when the fed sheet is an odd-numbered page and is not a final page, to print information printed on a next even-numbered page on a back side of the sheet.

Another object of the present invention is to provide the printing apparatus, wherein when the fed sheet is an even-numbered page, the control portion performs control to discharge the sheet without newly performing printing.

Another object of the present invention is to provide the printing apparatus, wherein when the fed sheet is an even-numbered page, the control portion performs control to print information printed on an immediate previous odd-numbered page on a back side of the sheet.

Another object of the present invention is to provide the printing apparatus, wherein when a final page of the fed sheets is an odd-numbered page, the control portion performs control to print information printed on the final page on a new sheet.

Another object of the present invention is to provide the printing apparatus, wherein the control portion performs control to discharge at least a sheet of an odd-numbered page among the fed sheets by sorting.

PREFERRED EMBODIMENTS OF THE INVENTION

Figure 1:
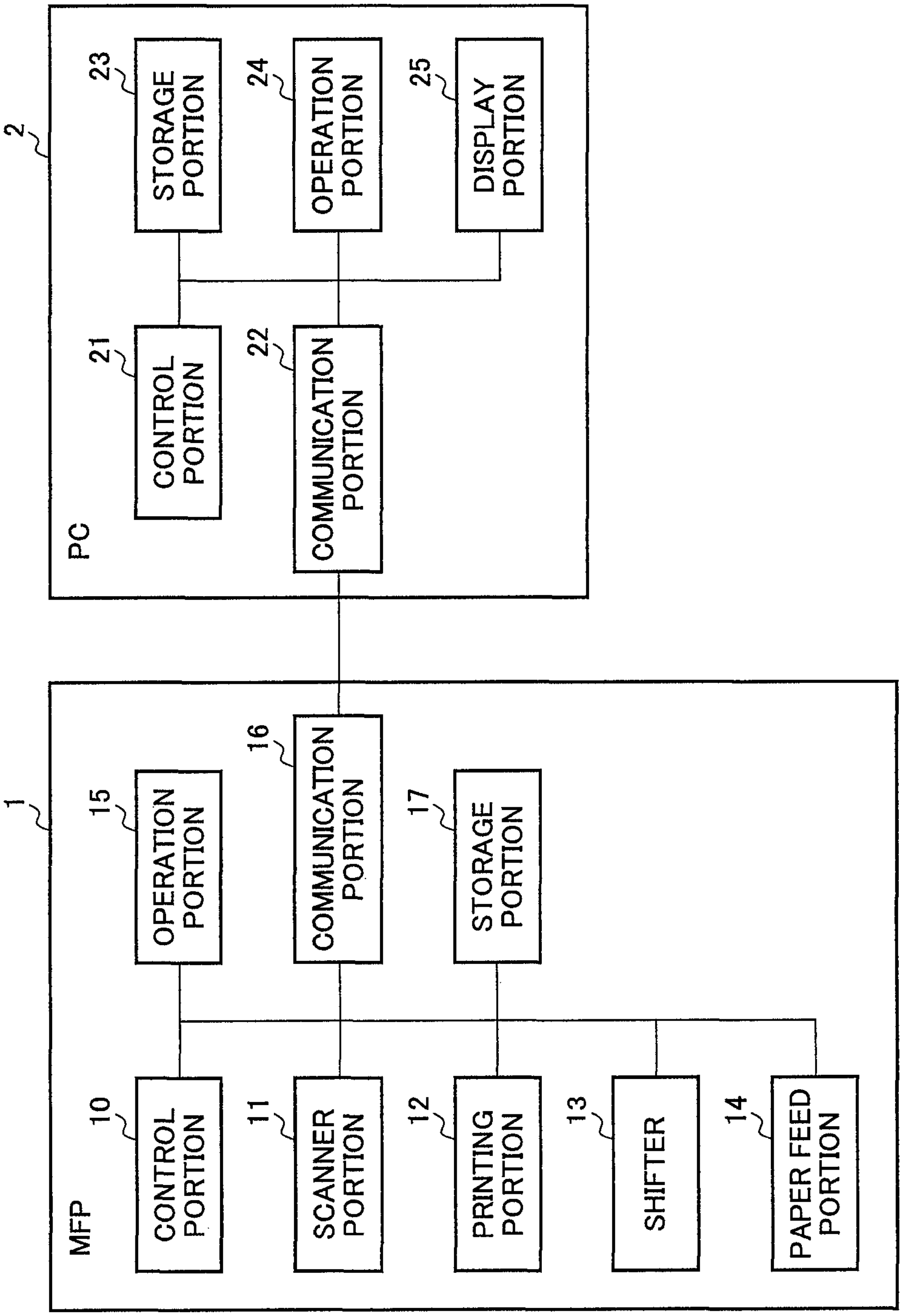
FIG. 1 is a block diagram showing a structure example of a printing system including a printing apparatus according to the present invention.

FIG. 1 is a block diagram showing a structure example of a printing system including a printing apparatus according to the present invention. The printing system exemplified in FIG. 1 is formed by connecting an MFP 1 as an example of the printing apparatus according to the present invention and a personal computer (PC) via a wired/wireless network such as a LAN (Local Area Network). The MFP 1 and the PC 2 are of course able to be connected peer-to-peer.

The MFP 1 is a device which has a plurality of functions such as a print function (function executing printing by an instruction from outside such as the PC 2), a copy function and other functions, and as other functions, a facsimile function, a file send function and the like are cited. Note that, though structure example that the MFP 1 has a copy function and a print function is taken, the printing apparatus according to the present invention is also able to be configured so as to have either one of the functions. That is, as the printing apparatus according to the present invention, in addition to the MFP, a printer with a simple print function, a copier with a simple copy function and the like are cited.

The MFP 1 exemplified in FIG. 1 is provided with, in addition to a control portion 10 which controls the entire MFP 1, a scanner portion (manuscript reading portion) 11, a printing portion 12, a shifter 13, a paper feed portion 14, an operation portion 15, a communication portion 16, and a storage portion 17.

In order to control the entire MFP 1, the control portion 10 is configured by a control device such as a CPU (Central Processing Unit) or an MPU (Micro Processing Unit), a RAM (Random Access Memory) as a working area, and a storage device which stores control programs (including a program for performing recovery double-sided printing processing according to the present invention that will be described below) and various setting contents. As this storage device, flash ROM (Read Only Memory), a hard disk or the like is cited. A part or whole of the control portion 10 is of course able to be configured by dedicated hardware.

The scanner portion 11 optically reads (scans) manuscript and converts the manuscript into electronic data to thereby generate image data of the manuscript. The printing portion 12 prints image data generated by the scanner portion 11 or image data received with a printing instruction from the PC 2.

The shifter 13 is a discharging mechanism for, changing a discharge position at a border part of a sheet bundle to perform offset discharge of the sheet, in order to clarify the border in each copy and make sorting work performed by the user after printing efficient, when discharging multiple copies of a printed matter printed by the printing portion 12 to a paper discharge tray (not shown) outside a main body of the MFP 1 or the like.

The paper feed portion 14 supplies a sheet from a paper feed tray for supplying a new sheet from a cassette-type tray such as a cassette cartridge and manual tray which does not require to be opened like the cassette-type paper feed tray.

The operation portion 15 receives user operations such as a copy operation and a printing instruction operation for printing print data which has been held. Therefore, the operation portion 15 is configured by an operation key, a display panel with a touch sensor for displaying a GUI (Graphical User Interface) image to receive an operation, and the like. Examples of this display panel include a liquid crystal display, an organic EL (electroluminescence) display and the like. The content of the user operation received by the operation portion 15 is provided to the control portion 10, and the control portion 10 causes the MFP 1 to operate in accordance with the content.

The communication portion 16 is comprised of network adapter and the like, and performs transmission and reception of data with an external apparatus such as the PC 2 through a network. The communication portion 16 is able to receive image data to be printed with a printing instruction from the PC 2 (that is, to receive a printing job), and is also able to transmit image data generated by the scanner portion 11 to the PC 2.

The storage portion 17 is configured by a hard disk and the like, and stores image data read by the scanner portion 11, image data received through the communication portion 16, and the like temporarily until printing is executed, for a predetermined period of time from execution of printing, or until a deletion instruction is given from the user. Note that, the storage portion 17 and the above-described storage device in the control portion 10 are also able to be mounted as a common device.

In addition, the MFP 1 preferably has a mechanism capable of performing double-sided printing, and description will be given below assuming that the MFP 1 has this mechanism. This mechanism is a mechanism which, for example, reverses a sheet having one side printed mechanically and automatically, and various existing mechanisms may be employed, so that detailed description of which will be omitted.

On the other hand, the PC 2 is provided with, in addition to a control portion 21 which controls the entire PC 2, a communication portion 22 such as a network adapter, a storage portion 23 such as a hard disk, an operation portion 24 such as a keyboard or a pointing device for receiving a user operation, and a display portion 25 such as a liquid crystal display or an organic EL display for displaying an image. Here, the communication portion 16 on the MFP 1 side is connected to the communication portion 22 through a network. Since each of the portions 21 to 25 already exists, detailed description of which will be omitted.

Next, description will be given for an example of recovery double-sided printing processing according to the present invention that is executed by the MFP 1 in the printing system of FIG. 1, with reference to the flowchart of FIG. 2. Here, the recovery double-sided printing processing refers to processing for reusing a sheet for which single-sided printing has been performed by an erroneous operation to create a printed matter having both sides printed.

First, the MFP 1 is provided with a receiving portion which receives a predetermined instruction as follows. This receiving portion may be the communication portion 16 which receives a predetermined instruction from the PC 2 or the operation portion 15 which receives a predetermined instruction. Moreover, the above-described predetermined instruction refers to an instruction for changing a sheet having one side printed and set to the manual tray of the paper feed portion 14 into a sheet having both sides printed with the same printing content, that is, an instruction for executing the above-described recovery double-sided printing processing.

Moreover, the above-described sheet having one side printed may be a sheet having one side printed by the MFP 1 in accordance with a single-sided printing instruction given from the main body of the MFP 1 or the PC 2 and discharged to the paper discharge tray, or a sheet having one side printed by other printing apparatus. Here, in order to receive the above-described predetermined instruction, the display panel of the operation portion 15 or the display portion 25 of the PC 2 are preferably caused to include a sentence which prompts to supply sheets for single-sided printing to the manual tray of the paper feed portion 14 in a GUI image. Moreover, for example, it may be configured such that the above-described predetermined instruction is defined to be formed by selection of a recovery double-sided printing processing button and selection of a start button, and a GUI image which includes the above-described sentence and a sentence which prompts to select the start button is displayed by the selection of the recovery double-sided printing processing button.

The recovery double-sided printing processing according to the present invention is executed by control of the control portion 10, when the above-described predetermined instruction is received by the above-described receiving portion. First, the user transmits document data targeted for double-sided printing (document data transmitted with setting to execute single-sided printing by mistake before) from the PC 2 to the MFP 1, or causes the scanner portion 11 to scan manuscript targeted for double-sided copy (that may be single-sided manuscript or double-sided manuscript, and that is manuscript for which copy is executed with setting to execute single-sided copy by mistake before). Note that, it is desired that document data is transmitted as a printing job involving the above-described predetermined instruction.

The control portion 10 judges whether or not document data (image data of a document file) is received by the communication portion 16 from the PC 2 (step S1), and in the case of being received, saves the data in the storage portion 17 (step S4). On the other hand, in the case of not being received, it is judged whether or not manuscript (print source sheet) is set in the tray of the scanner portion 11 (step S2), and when setting is recognized (in the case of YES at step S2), the manuscript is scanned (step S3) and image data obtained by scanning is saved in the storage portion 17 (step S4). Note that, the order of step S1 and steps S2 and S3 is pretermitted.

Subsequent to step S4, by control of the control portion 10, printing processing is executed for the image data stored in the storage portion 17 (step S5). This printing processing is main processing of the above-described recovery double-sided printing processing and will be described in detail below.

Step S5 is processing for a case where the above-described predetermined instruction is received. At this time, the control portion 10 feeds a sheet having one side printed from the manual tray of the paper feed portion 14, and when the fed sheet is an odd-numbered page, controls the printing portion 12 and the like so as to print information printed on a next even-numbered page (immediately following even-numbered page) (that is, an image of a next even-numbered page) on a back side of the sheet. With such control, at least one copy of a printed matter having both sides printed is discharged to the paper discharge tray, though a specific example of which will be described below.

Moreover, here, it is assumed that there is also a case where the recovery double-sided printing processing is executed after a certain amount of time elapses from single-sided printing by mistake. Therefore, an example that print data (or image data serving as a source thereof) becomes necessary again for the recovery double-sided printing processing is taken. However, for example, with print data for which single-sided printing has been performed by mistake saved in the storage portion 17, the print data may be read automatically or by selection (that is, same print data is used), to execute recovery double-sided printing processing with the print data as to a page which needs to be printed.

As described above, according to the present invention, in the MFP 1 capable of performing double-sided printing, for a sheet which has been operated to execute single-sided printing by mistake even though double-sided printing is to be performed, just by setting the sheet having one side printed in the manual tray of the paper feed portion 14 to give a predetermined instruction by the user, it is possible to create at least only one set of a double-side printed matter by printing a page corresponding to a back side. Therefore, it is possible to easily reuse the sheet for which single-sided printing has been performed by mistake to change to double-sided printing, so that sheets are not to be wasted as much as possible.

Moreover, as a main feature of the recovery double-sided printing processing of the present invention, when a final page (last page) of fed sheets is an odd-numbered page, the control portion 10 discharges the sheet of the final page without newly performing printing (without performing printing on a back side thereof).

Next, description will be given for a specific example of such recovery double-sided printing processing.

In an example of the recovery double-sided printing according to the present invention (changing from single-sided printing to double-sided printing), a sheet for which single-sided printing has been performed by an erroneous operation is reused to create one copy of a double-side printed matter. Such an example will be taken below with reference to FIGS. 3 to 6.

Figure 2:
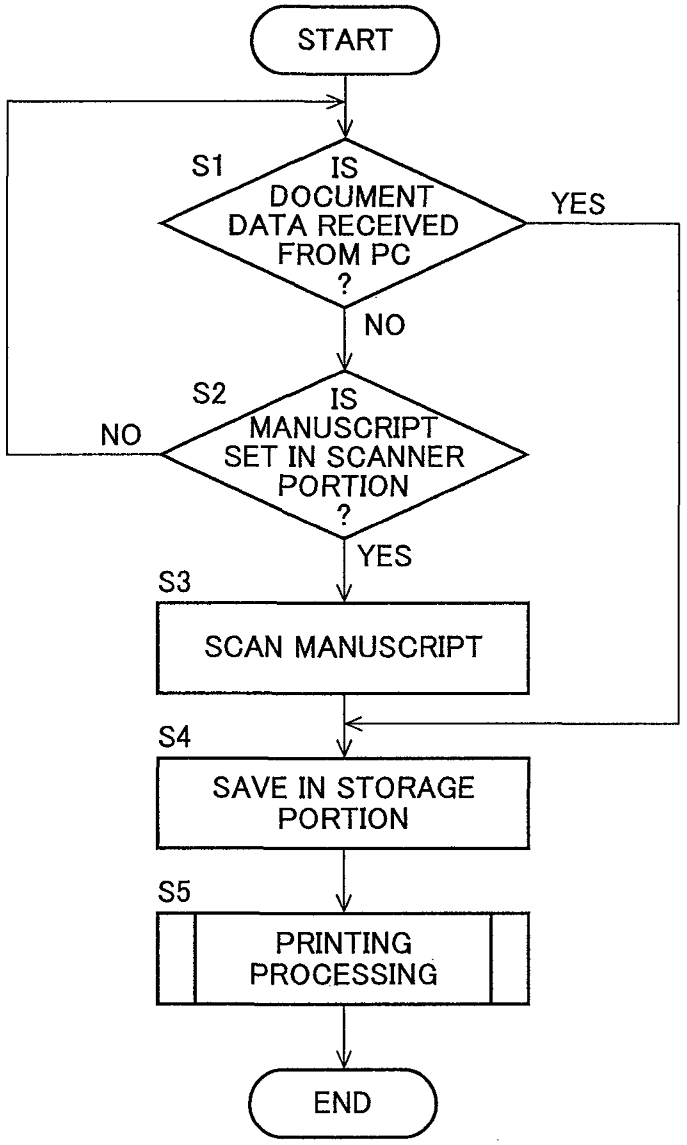
FIG. 2 is a flowchart for explaining an example of recovery double-sided printing processing which is executed in an MFP of the printing system of FIG. 1.
Figure 3:
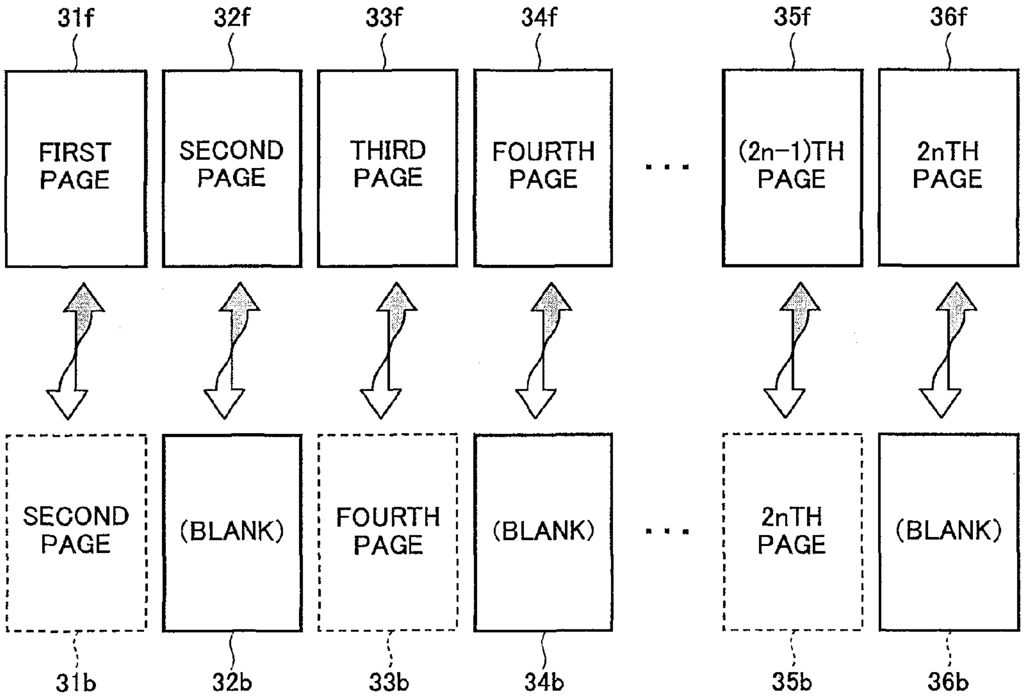
FIG. 3 is a view for explaining an example of printing processing which is main processing of the recovery double-sided printing processing of FIG. 2, that is executed when the number of sheets is even.
Figure 4:
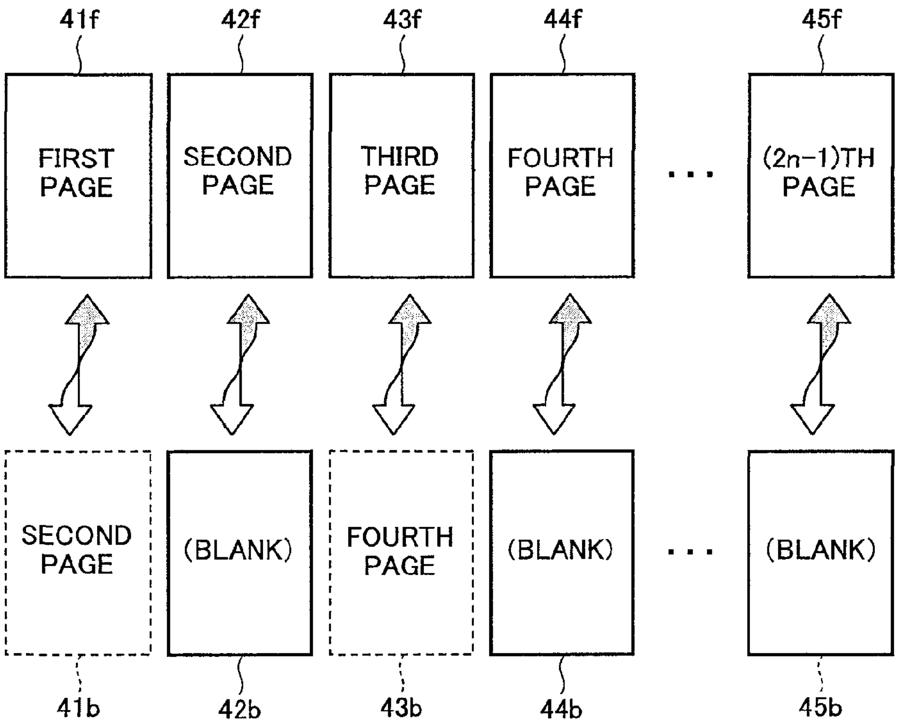
FIG. 4 is a view for explaining an example of printing processing which is main processing of the recovery double-sided printing processing of FIG. 2, that is executed when the number of sheets is odd.
Figure 5:
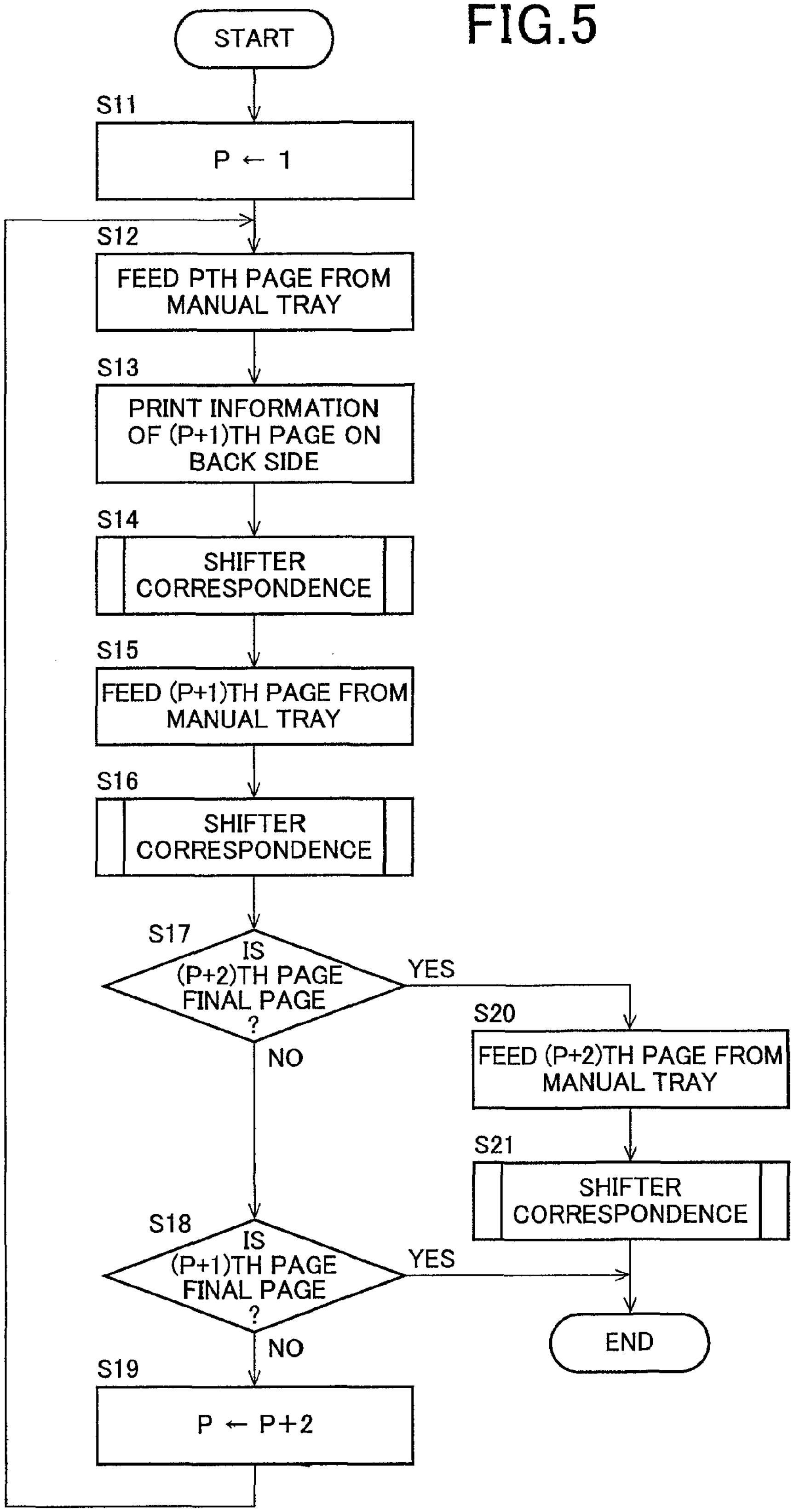
FIG. 5 is a flowchart for explaining a flow of the printing processing shown in FIG. 3 and FIG. 4.
Figure 6:
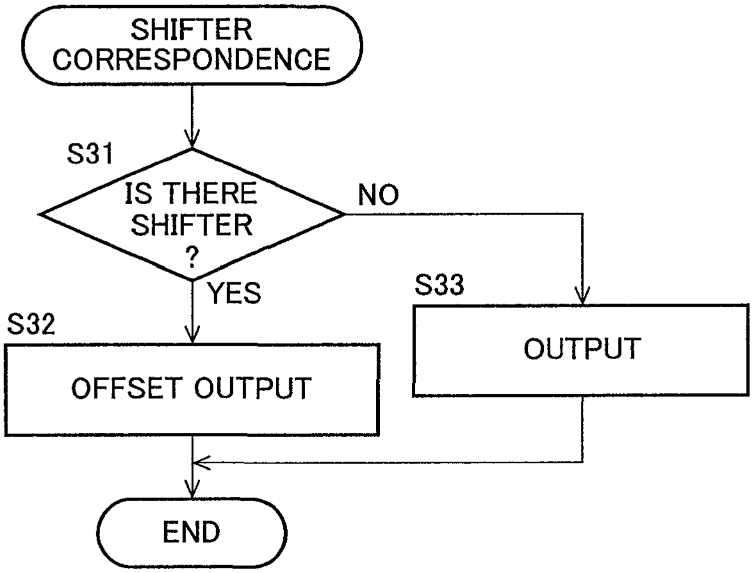
FIG. 6 is a flowchart for explaining an example of processing of shifter correspondence in FIG. 5.

FIG. 3 and FIG. 4 are views for explaining an example of the printing processing of step S5 that is main processing of the recovery double-sided printing processing of FIG. 2, that is executed when the number of sheets is even and odd, respectively. Moreover, FIG. 5 is a flowchart for explaining a flow of the printing processing, and FIG. 6 is a flowchart for explaining an example of processing of shifter correspondence in FIG. 5.

The control portion 10 in this example, when a fed sheet is an even-numbered page, performs control to discharge the sheet without newly performing printing. Moreover, as described above, the control portion 10, when a fed sheet is an odd-numbered page and a final page, performs control to discharge the sheet without newly performing printing, and when the sheet is not a final page, performs control to print information printed on a next even-numbered page on a back side of the sheet.

Description will be given more specifically shown in FIG. 3, for a sheet whose front side (side which is printed by single-sided printing) is a first page 31*f*, a second page 31*b* (the same information as that of a second page 32*f*) is printed on a back side, and a sheet whose front side is a second page 32*f* is discharged with a back side remained blank 32*b*. Similarly, for a sheet whose front side is a third page 33*f*, a fourth page 33*b* is printed on a back side, and a sheet whose front side is a fourth page 34*f* is discharged with a back side remained blank 34*b*. Similarly, for a sheet whose front side is a (2n−1)th page 35*f*, a 2nth page 35*b* is printed on a back side, and a sheet whose front side is a 2nth page 36*f* is discharged with a back side remained blank 36*b*.

Note that, in a lower stage of FIG. 3, a page indicated by a solid line frame shows a page which is discharged with a back side remained blank, and a page indicated by a dashed line frame shows a page whose back side is printed by the recovery double-sided printing processing according to the present invention. Moreover, correspondence between a front side and a back side is indicated with a arrow twisted for reverse. The same is also applied to FIG. 4, FIG. 7 and FIG. 8 described below.

Here, judgment of whether or not a fed sheet is an even-numbered page may be executed simply depending on whether or not a sheet fed from the manual tray of the paper feed portion 14 is an even-numbered page, when a paper feed mechanism for feeding from a first page is provided in the manual tray of the paper feed portion 14.

In this example, since a printed matter may be one set, a sheet whose front side is an even-numbered page such as a second page is to be discharged unused without being printed anything. With such printing, when the number of sheets of single-sided printing is even, one set of a double-sided printed matter is able to be created.

In addition, as described above, in this example as well, when a final page of fed sheets is an odd-numbered page, the control portion 10 performs control so as to perform paper discharge without newly performing printing on the sheet of the final page as shown in FIG. 4. That is, a sheet of a (2n−1)th page 45*f* whose front side is a final page is discharged with a back side remained blank 45*b*.

Printing and paper discharge are performed basically in the same manner as the example of FIG. 3 prior to a final page. For example, for a sheet whose front side is a first page 41*f*, a second page 41*b* is printed on a back side and a sheet whose front side is a second page 42*f* is discharged with aback side remained blank 42*b*, and for a sheet whose front side is a third page 43*f*, a fourth page 43*b* is printed on a back side, and a sheet whose front side is a fourth page 44*f* is discharged with a back side remained blank 44*b*.

As described above, it is possible to execute processing for printing a corresponding page on a sheet of a printing destination as shown in FIG. 3 and FIG. 4 at step S5. Next, description will be given for a flow of the printing processing of step S5 for obtaining the printing result as shown in FIG. 3 and FIG. 4, with reference to FIG. 5. Though not particularly described in the following explanation, this printing processing is executed by controlling other part as necessary mainly by the control portion 10.

First, 1 is substituted to a variable number P (step S11). Here, P corresponds to a following page number. Next, a sheet of a Pth page having one side printed that is set in the manual tray of the paper feed portion 14 is fed (step S12), and, information of a (P+1)th page is printed on a back side of the sheet which is fed at this time (step S13).

Thereafter, processing of shifter correspondence is performed (step S14). The detailed step S14 will be described with reference to FIG. 6. First, the control portion 10 performs judgment of whether or not the MFP 1 corresponds to the shifter 13 (whether the shifter 13 is provided) (step S31), and when the shifter 13 is not provided (in the case of NO at step S31), paper discharge (output) is performed to the paper discharge tray as it is (step S33).

On the other hand, when corresponding to the shifter (in the case of YES at step S31), offset output is performed (step S32). The offset output refers to perform paper discharge to the paper discharge tray by providing offset. Actually, by differentiating an offset amount at step S14 and an offset amount at step S16 described below, a sheet of a set of a double-sided printed matter and an original sheet which remains being subjected to single-sided printing are overlapped alternately so as to be able to be distinguished, so that a double-sided printed matter is able to be sorted easily from other sheets. Moreover, an offset amount at step S21 described below may be the same as the offset amount at step S14.

Note that, processing of shifter correspondence including the processing of step S14 becomes advantageous, when the shifter 13 is provided as an option of the MFP 1 or when a control program is made common between the MFP 1 with the shifter 13 and another type of an MFP without a shifter.

Subsequently, similarly to step S12, a sheet of a (P+1)th page having one side printed that is set in the manual tray of the paper feed portion 14 is fed (step S15), and processing of shifter correspondence is performed similarly to step S14 for paper discharge (step S16). At this time, the fed sheet is discharged without executing printing. With the processing so far, a second page is printed on a back side of a first page having one side printed and discharged, and a second page having one side printed is discharged as it is.

Subsequently, whether or not a (P+2)th page is a final page is judged (step S17). When it is judged as not being a final page, whether or not the (P+1)th page is a final page is then judged (step S18). When it is judged as not being a final page at step S18, 2 is added to P (step S19) and the procedure returns to step S12.

On the other hand, in the case of YES at step S17 (when it is judged that the (P+2)th page is a final page), a sheet on the (P+2)th page is fed from the manual tray of the paper feed portion 14 (step S20), subjected to processing of shifter correspondence similarly to step S14, and discharged as it is (step S21). After the processing of step S21 and in the case of YES at step S18, the processing ends.

Description will be given taking a case where sheets for which single-sided printing has been performed by mistake are four pages in total as an example. At steps S11 to S19, a second page is printed on a back side of a first page having one side printed to be discharged, the second page having one side printed is discharged as it is, and the value of P becomes 3. Next, at steps S12 to S16, a fourth page is printed on a back side of a third page having one side printed to be discharged, and the fourth page having one side printed is discharged as it is.

Then, though whether or not a (3+2)th page is a final page is judged at step S17, the final page is the fourth page, so that the procedure moves to step S18, and a (3+1)th page is the final page, so that YES is given at step S18 and the processing ends. Moreover, if there are five pages in total, the procedure moves to step S20 from step S17, a fifth page is fed and discharged without performing printing, and the processing ends.

In the above-described example, though description has been given with the example an even-numbered page is printed on a back side of an odd-numbered page, an odd-numbered page may be printed on a back side of an even-numbered page.

Next, description will be given for a specific example different from the recovery double-sided printing processing described above.

In another example of the recovery double-sided printing according to the present invention (changing from single-sided printing to double-sided printing), a sheet for which single-sided printing has been performed by an erroneous operation is reused to create two copies of a double-side printed matter. Such an example will be taken below with reference to FIGS. 7 to 9.

Figure 7:
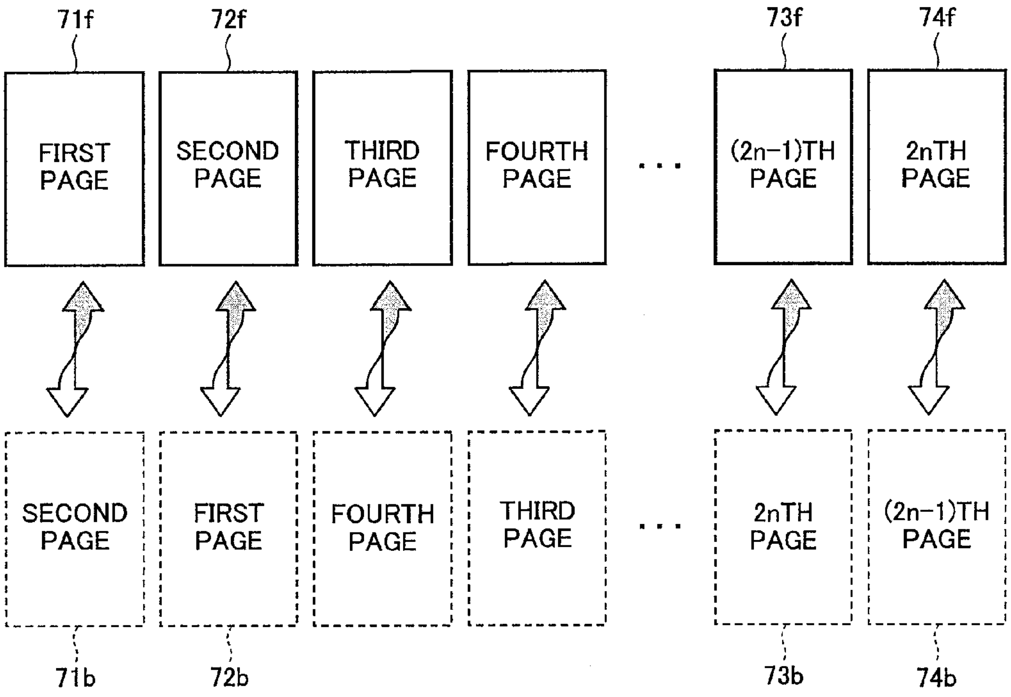
FIG. 7 is a view for explaining another example of printing processing which is main processing of the recovery double-sided printing processing of FIG. 2, that is executed when the number of sheets is even.
Figure 8:
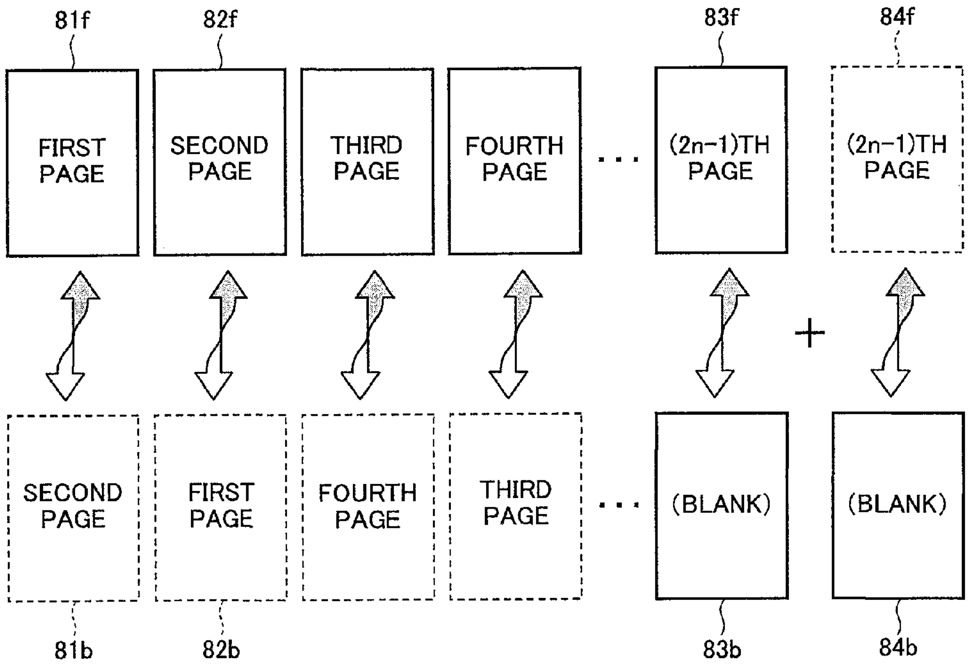
FIG. 8 is a view for explaining another example of printing processing which is main processing of the recovery double-sided printing processing of FIG. 2, that is executed when the number of sheets is odd.
Figure 9:
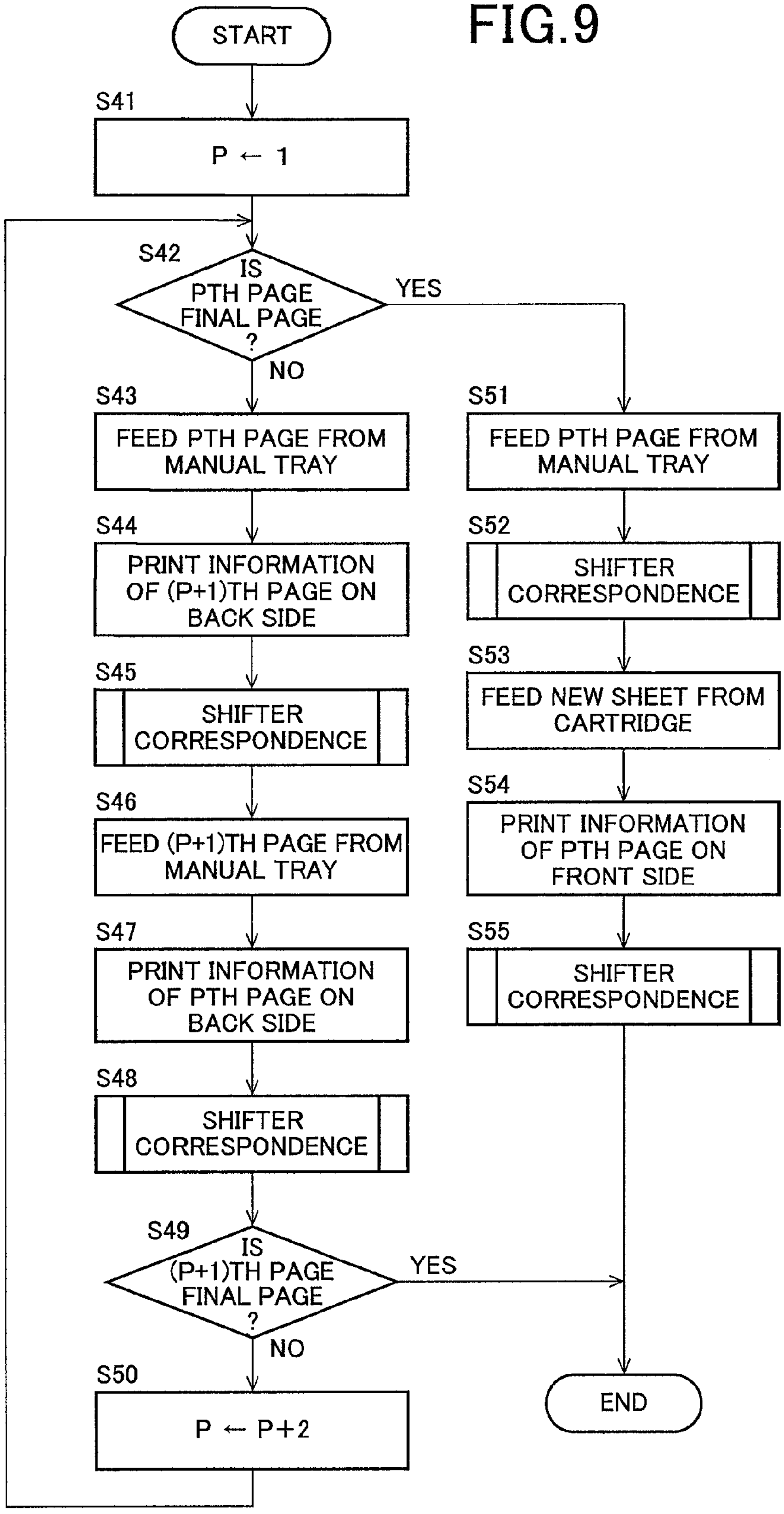
FIG. 9 is a flowchart for explaining a flow of the printing processing shown in FIG. 7 and FIG. 8.

FIG. 7 and FIG. 8 are views for explaining another example of the printing processing of step S5 that is main processing of the recovery double-sided printing processing of FIG. 2, that is executed when the number of sheets is even and odd, respectively. Moreover, FIG. 9 is a flowchart for explaining a flow of the printing processing.

The control portion 10 in this example, when a fed sheet is an even-numbered page (that is, for a sheet corresponding to an even-numbered page among sheets to be fed by the above-described predetermined instruction), performs control to print information printed on an immediately previous odd-numbered page on a back side of the sheet. Moreover, as described above, the control portion 10, in a case where a fed sheet is on an odd-numbered page, when the fed sheet is a final page, performs control to discharge the sheet without newly performing printing, and when the sheet is not a final page, performs control to print information printed on a next even-numbered page on a back side of the sheet.

Description will be given more specifically. As shown in FIG. 7, for a sheet whose front side (side which is printed by single-sided printing) is a first page 71*f*, a second page 71*b* is printed on a back side, and for a sheet whose front side is a second page 72*f*, a first page 72*b* is printed on a back side. Similarly, for a sheet whose front side is a (2n−1)th (n is an integer of 2 or more) page 73*f*, a 2nth page 73*b* is printed on a back side, and for a sheet whose front side is a 2nth page 74*f*, (2n−1)th page 74*b* is printed on a back side. With such printing, two sets of a double-sided printed matter, are able to be created in total.

Moreover, when a final page (last page) of fed sheets is an odd-numbered page, the control portion 10 may perform control to discharge the sheet of the final page without newly performing printing (without performing printing on a back side thereof) as well as to print information printed on the final page on a new sheet (so-called blank sheet) from the cassette-type tray of the paper feed portion 14. Thereby, a new printed sheet with the final page printed is to be added.

Description will be given more specifically. As shown in FIG. 8, for a sheet whose front side is a first page 81*f*, a second page 81*b* is printed on a back side, and for a sheet whose front side is a second page 82*f*, a first page 82*b* is printed on a back side. Printing is executed in the same manner prior to a final page. The processing is the same as the example of FIG. 7 so far. Description will be given for a final page. A sheet of a (2n−1)th page 83*f* whose front side is a final page is discharged with a back side remained blank 83*b*, and information same as the (2n−1)th page 83*f* which is a final page (information printed on the (2n−1)th page 83*f*) is printed on one face (serving as a front side) of a new sheet, so that a (2n−1)th page 84*f* which is a new final page is created and is discharged with a back side thereof remained blank 84*b*.

Such printing makes it possible to newly create, one sheet of a final page and two sheets are obtained in total, resulting that not only when a final page is an even-numbered page but also an odd-numbered page, that is, even when the number of sheets for single-sided printing is odd, it is possible to create two sets of a double-sided printed matter in total (of course, since the final page is an odd-numbered page, a back side thereof is blank).

As described above, it is possible to execute processing for printing a corresponding page on a sheet of a printing destination as shown in FIG. 7 and FIG. 8 at step S5. Next, description will be given for a flow of the printing processing of step S5 for obtaining the printing result as shown in FIG. 7 and FIG. 8, with reference to FIG. 9. Though not particularly described in the following explanation, this printing processing is executed by controlling other part as necessary mainly by the control portion 10.

First, 1 is substituted to a variable number P (step S41). Here, P corresponds to a following page number. Next, whether or not a Pth page is a final page is judged (step S42), and when it is judged as not being a final page (in the case of NO), the sheet of the Pth page having one side printed that is set in the manual tray of the paper feed portion 14 is fed (step S43), and information of a (P+1)th page is printed on a back side of the sheet which is fed at this time (step S44). Thereafter, processing of shifter correspondence is performed similarly to step S14 for paper discharge (step S45).

Subsequently, similarly to step S43, a sheet of a (P+1)th page having one side printed that is set in the manual tray of the paper feed portion 14 is fed (step S46), and, information of a Pth page is printed on a aback side of the sheet which is fed at this time (step S47) At step S47, in other words, printing is performed with print data of information printed on the Pth page. With the processing so far, a second page is printed on a back side of a first page having one side printed, and a first page is printed on a back side of a second page having one side printed. Thereafter, processing of shifter correspondence is performed similarly to step S45 for paper discharge (step S48). Subsequently, whether or not the (P+1)th page is a final page is judged (step S49), when it is judged as not being a final page, 2 is added to P (step S50) and the procedure returns to step S42.

On the other hand, in the case of YES at step S42 (when it is judged that the Pth page is a final page), the procedure moves to step S51. For example, there are three pages in total, a second page is printed on a back side of a first page having one side printed and a first page is printed on a back side of a second page having one side printed at steps S41 to S48, and since the (P+1)th page (second page in this example) is not a final page at step S49, 2 is added at step S50, and P becomes 3, so that a third page is judged as being final at step S42 and the procedure moves to step S51.

Note that, as a method for judging whether or not to be a final page, a method for using the number of pages stored in the storage portion 17, a method for executing steps S43 and S51 commonly in advance instead of step S42 and judging whether or not a sheet is left in the manual tray of the paper feed portion 14 after the Pth page is fed at step S42, or the like is able to be used.

At step S51, the sheet of the Pth page having one side printed that is set in the manual tray of the paper feed portion 14 is fed. Thereafter, this fed sheet is subjected to processing of shifter correspondence similarly to step S45 without performing printing, and is discharged (step S52).

Next, since a final page (which is a Pth page and the third page in the above-described example where there are three pages in total) of the second copy (the second set) is lacking, paper feeding is performed not from the manual tray of the paper feed portion 14 but from a paper feed tray of the paper feed portion 14 for supplying a new sheet (for example, a cassette cartridge tray) (step S53), and information of the final page (Pth page) is printed on a front side (step S54). Note that, the side on which the Pth page is printed actually serves as the front side. After step S54, processing of shifter correspondence is performed similarly to step S45 for paper discharge (step S55). After processing of step S55 and in the case of YES at step S49, the processing ends.

Moreover, though description has been given taking an example of simply performing shifter in the above-described processing, in a case where, after information printed on the Pth page is printed on a back side of an even-numbered page on the (P+1)th page at step S47, paper discharge is performed as it is, arrangement does not become in page order as the second, first, fourth and third pages. Thus, after step S47, by adding processing for reversing front and back sides of a sheet, it becomes possible to correct arrangement of pages to be normal.

Though an example has been taken that the shifter is used to perform shifting so that sorting is performed easily with reference to FIGS. 3 to 6 and FIGS. 7 to 9, a sorter may be used instead of the shifter 13.

For that, the MFP 1 is provided with the sorter. In addition, the control portion 10 may perform control to perform paper discharge by sorting at least sheets of odd-numbered pages among fed sheets (of course, by sorting in page order). Of course, control is preferably performed so that other sheets are also sorted in page order to be discharged. More specifically, instead of the processing of shifter correspondence in the processing of FIG. 5 (steps S14, S16 and S21) and the processing of shifter correspondence in the processing of FIG. 9 (steps S45, S48, S52, and S55), the sort processing may be performed so as to perform paper discharge to the paper discharge tray as appropriate or after saving in other place.

Here, in the sort processing of FIG. 5, for example, when the discharged sheets at step S14 are placed and thereafter the discharged sheets at step S21 are placed, it is possible to arrange the sheets in page order. Moreover, similarly, the discharged sheets at step S16 are a group of single-side printed matters of even-numbered pages and do not particularly need to be sorted. A set of double-side printed matters and a set of single-side printed matters may be discharged in different paper discharge trays, but discharge may be performed so as to shift at a border of sets by the shifter 13 for one paper discharge tray.

Moreover, in the sort processing of FIG. 9, for example, when the discharged sheets at step S45 are placed and thereafter the discharged sheets at step S52 are placed, it is possible to arrange a first set in page order. In addition, similarly, when the discharged sheets at step S46 are reversed and placed, and thereafter the discharged sheets at step S55 are reversed and placed, it is also possible to arrange a second set in page order. The first set and the second set may be discharged in different paper discharge trays, but discharge may be performed so as to shift at a border of sets by the shifter 13 for one paper discharge tray.

By employing the sort processing as described above, at least one set is able to be obtained in a state where double-side printed matters are arranged correctly, and compared to a case where paper discharge is performed as in original order at the time of single-sided printing or a case where sheets are shifted one by one by the shifter, it is possible to save the labor of sorting (labor of arrangement) of the user.

As above, though description has been given for the printing apparatus according to the present invention, as explained for processing procedure thereof, the present invention can take a form as a printing method in the printing apparatus configured as described above. This printing method has a step in which a receiving portion receives an instruction for changing a sheet having one side printed that is set to a paper feed tray into a sheet having both sides printed with same printing content, and a step in which a control portion performs control, when the instruction is received, to feed the sheet having one side printed from the paper feed tray, and when the fed sheet is an odd-numbered page and is a final page, to discharge the sheet without newly performing printing, and when the fed sheet is an odd-numbered page and is not a final page, to print information printed on a next even-numbered page on a back side of the sheet. Other applications and effects are as explained for the printing apparatus, and description of which will be omitted.

Moreover, the present invention can take a form as a program for causing the control portion of the printing apparatus to execute the above-described printing method (that is, a program for performing the recovery double-sided printing processing in the control portion 10 of FIG. 1). By storing this program in the storage device of the control portion 10 (or the storage portion 17) and reading the program from the storage device for execution, it is possible to realize functions according to the present invention.

Moreover, the present invention can take a form as a computer readable recording medium having this program stored therein. As this recording medium, portable recording medium such as a CD (Compact Disc), a DVD (Digital Versatile Disc), a BD (Blu-ray Disc), or a Universal Serial Bus (USB: registered trademark) memory is cited. In this form, by reading the program by the control portion 10 from the above-described recording medium for execution, or by reading the program by the control portion 10 from the above-described recording medium to store in the storage device of the control portion 10 (or the storage portion 17) and reading the program from the storage device for execution, it is possible to realize functions according to the present invention.

As described above, the printing apparatus according to the present invention includes, in the printing apparatus capable of performing double-sided printing on a sheet, a receiving portion for receiving an instruction for changing a sheet having one side printed that is set to a paper feed tray to a sheet having both sides printed with same printing content, and a control portion for performing control, when the instruction is received, to feed the sheet having one side printed from the paper feed tray, and when the fed sheet is an odd-numbered page and is a final page, to discharge the sheet without newly performing printing, and when the fed sheet is an odd-numbered page and is not a final page, to print information printed on a next even-numbered page on a back side of the sheet. Thereby, with respect to a sheet for which an operation has been performed to execute single-sided printing by mistake even though double-sided printing is to be performed, it is possible to create at least one set of a double-side printed matter with a page corresponding to a back side printed, and it is possible to prevent wasted printing processing without information from being executed when a final page is on an odd-numbered page. In this manner, according to the present invention, it is possible to reuse sheets easily and sheets are not to be wasted as much as possible.

Moreover, when the fed sheet is an even-numbered page, the control portion may perform control discharge the sheet without newly performing printing. This makes it possible to create one set of a double-side printed matter, and to reduce the consumption of ink and toner compared to the case of creating two sets.

Moreover, instead, when the fed sheet is an even-numbered page, the control portion may perform control to print information printed on an immediate previous odd-numbered page on a back side of the sheet. This makes it possible to create two sets of a double-side printed matter in total.

At this time, when a final page of the fed sheets is an odd-numbered page, the control portion may perform control to print information printed on the final page on a new sheet. This makes it possible to create two sets of a double-side printed matter in total, not only when the final page is on an even-numbered page but also on an odd-numbered page.

Moreover, the control portion may perform control to discharge at least a sheet on an odd-numbered page among the fed sheets by sorting. This makes it possible to obtain at least one set in a state where double-side printed matters are arranged correctly, and to save the labor of arrangement.

As above, according to the present invention, in a printing apparatus capable of performing double-sided printing, a page corresponding to a back side is printed with respect to a sheet for which an operation has been performed to execute single-sided printing by mistake even though double-sided printing is to be performed, so that it is possible to reuse sheets easily and sheets are not to be wasted as much as possible.

The invention claimed is:

1. A printing apparatus capable of performing double-sided printing on a sheet, comprising:

a receiving portion for receiving an instruction for changing a sheet having only a front side printed that is set to a paper feed tray into a sheet having both sides printed with same printing content, and a control portion for performing control:

when the instruction is received, to feed the sheet having one side printed from the paper feed tray, when the fed sheet is an odd-numbered page and is a final page, to discharge the sheet without newly performing printing, and when the fed sheet is an odd-numbered page and is not a final page, to print information printed on a next even-numbered page on a back side of the fed sheet and to not print information on a front side of the fed sheet.

2. The printing apparatus according to claim 1, wherein when the fed sheet is an even-numbered page, the control portion performs control to discharge the sheet without newly performing printing.

3. The printing apparatus according to claim 1, wherein when the fed sheet is an even-numbered page, the control portion performs control to print information printed on an immediate previous odd-numbered page on a back side of the sheet.

4. The printing apparatus according to claim 3, wherein when a final page of the fed sheets is an odd-numbered page, the control portion performs control to print information printed on the final page on a new sheet.

5. The printing apparatus according to claim 1, wherein the control portion performs control to discharge at least a sheet of an odd-numbered page among the fed sheets by sorting.

* * * * *